United States Patent [19]

Hotine

[11] Patent Number: 4,937,840
[45] Date of Patent: Jun. 26, 1990

[54] CIRCUIT FOR PULSED BIPHASE DIGITAL MODULATION

[76] Inventor: William Hotine, 633 Ramona Ave., #23, Los Osos, Calif. 93402

[21] Appl. No.: 268,073

[22] Filed: Nov. 7, 1988

[51] Int. Cl.⁵ .............................................. H04L 27/20
[52] U.S. Cl. ........................................ 375/53; 375/67; 375/52
[58] Field of Search ......................... 375/53, 86, 67, 52

[56] References Cited

U.S. PATENT DOCUMENTS

| | | | |
|---|---|---|---|
| 3,157,740 | 11/1964 | Crafts | 375/53 |
| 3,242,431 | 3/1966 | Crafts | 375/86 |
| 3,914,695 | 10/1975 | Giusto | 375/67 |
| 4,656,647 | 4/1987 | Hotine | 375/52 |

*Primary Examiner*—Benedict V. Safourek
*Assistant Examiner*—Tesfaldet Bocure

[57] ABSTRACT

An improved circuit for pulsed biphase modulation of a sine wave carrier having the same frequency as the clock frequency selects carrier phase deviations from static phase shift circuits by means of multiple bilateral semiconductor switches which are controlled by coded pulses generated in a digital processing cirucit receiving NRZ digital data. The switches are controlled by the pulses to disconnect the carrier and to connect the phase deviations to the output at the start and at the middle of a cycle of the carrier frequency.

4 Claims, 1 Drawing Sheet

CIRCUIT FOR PULSED BIPHASE DIGITAL MODULATION

BACKGROUND OF INVENTION

The present invention is an improved circuit enabling pulsed biphase digital modulation of a sine wave carrier frequency, and is an improvement over the modulating circuit shown in U.S. Pat. No. 4,656,647, issued to Applicant William Hotine on Apr. 7, 1987. This patent describes a system of pulsed biphase digital modulation for a sine wave carrier and shows a diagram of the modulating circuit in its FIG. 1. Although this circuit operated satisfactorily using a high radio frequency carrier and a low frequency of digital modulation, it was found to be unsatisfactory when using the same frequency for carrier and modulation at low frequencies. At low frequencies abrupt changes in current in the inductor used to generate a lagging phase shift caused transients to be developed in the circuit. This was caused by ringing of the inductor. It was concluded that generating phase shifts by use of pulses with an inductor was undesirable, and that a method of selecting phases from several static phase shifting circuits would not entail the use of pulses to generate the phase shifts, and would be a superior method. Fortunately there is available a CMOS integrated circuit called a quad bilateral switch, type CD4066 designed by R.C.A. This device contains four separate bilaterial switches capable of one fiftieth microsecond pulsed operation, and can switch up to 2 volts R.M.S. By using this device a novel modulating circuit has been devised, in which two of the switches are normally closed to transmit the carrier and are opened by negative pulses which are the complements of positive pulses closing the other two switches to transmit leading or lagging phase shifts during the duration of short positive pulses timed at the start and at the middle of a cycle of the carrier frequency.

SUMMARY OF THE INVENTION

The present invention, instead of having separate sources for the sine wave carrier and the square wave oscillator as in the cited patent, derives the sine wave carrier from the clock oscillator. This method insures that the phase deviation modulating pulses take place exactly at the zero cross over point of the sine wave carrier. The coding used in the present invention is the same as in the aforementioned patent. A digital one is encoded as a brief pulse of a leading phase angle at the beginning of a clock cycle and a brief pulse of a lagging phase angle at the middle of this clock cycle, while a digital zero is encoded by a brief pulse of a lagging phase angle at the middle of a clock cycle. When the clock frequency and carrier frequency are the same and also phase coherent, these pulses take place at the zero crossover points of the sine wave carrier.

In the circuit of the present invention, the output of the square wave clock oscillator is passed through an inductance—capacity low pass filter which has a sine wave output with its phase lagging the clock oscillator. This sine wave is then brought into coherent phase with the clock oscillator by use of a capacity-resistor leading phase shift circuit. This synchronous sine wave carrier is applied to two separate capacitor-resistor phase shift circuits, and to the inputs of two normally closed bilateral switches in series which can feed the phase coherent carrier to the output circuit. One of the phase shift circuits has a leading phase angle output and the other phase shift circuit a lagging phase angle output. The leading phase angle output is connected to the input of a third normally open bilateral switch, the output of which feeds the output circuit, and the lagging phase angle output in connected to the input of a fourth normally open bilateral switch, the output of which also feeds the output circuit. The bilateral switches are actuated by modulating pulses and their complements from a digital processing and encoding circuit to select an output from the leading phase shift circuit, the lagging phase shift circuit, or the coherent phase carrier.

Accordingly, it is object of the invention to provide switching means to select the output phase of the carrier according to the coded modulating control pulses and their complements at the start and at the middle of a cycle of the carrier frequency.

A further object of the invention is to provide means for accurately maintaining zero phase coherence of the sine wave carrier with the square wave clock oscillator.

For a better understanding of the invention and its advantages, and objects attained by its use, reference should be had to the accompanying drawings and the accompanying description, in which there illustrated and described the preferred embodiment of the invention.

DESCRIPTION OF THE PREFERRED EMBODIMENT

Figure 1:
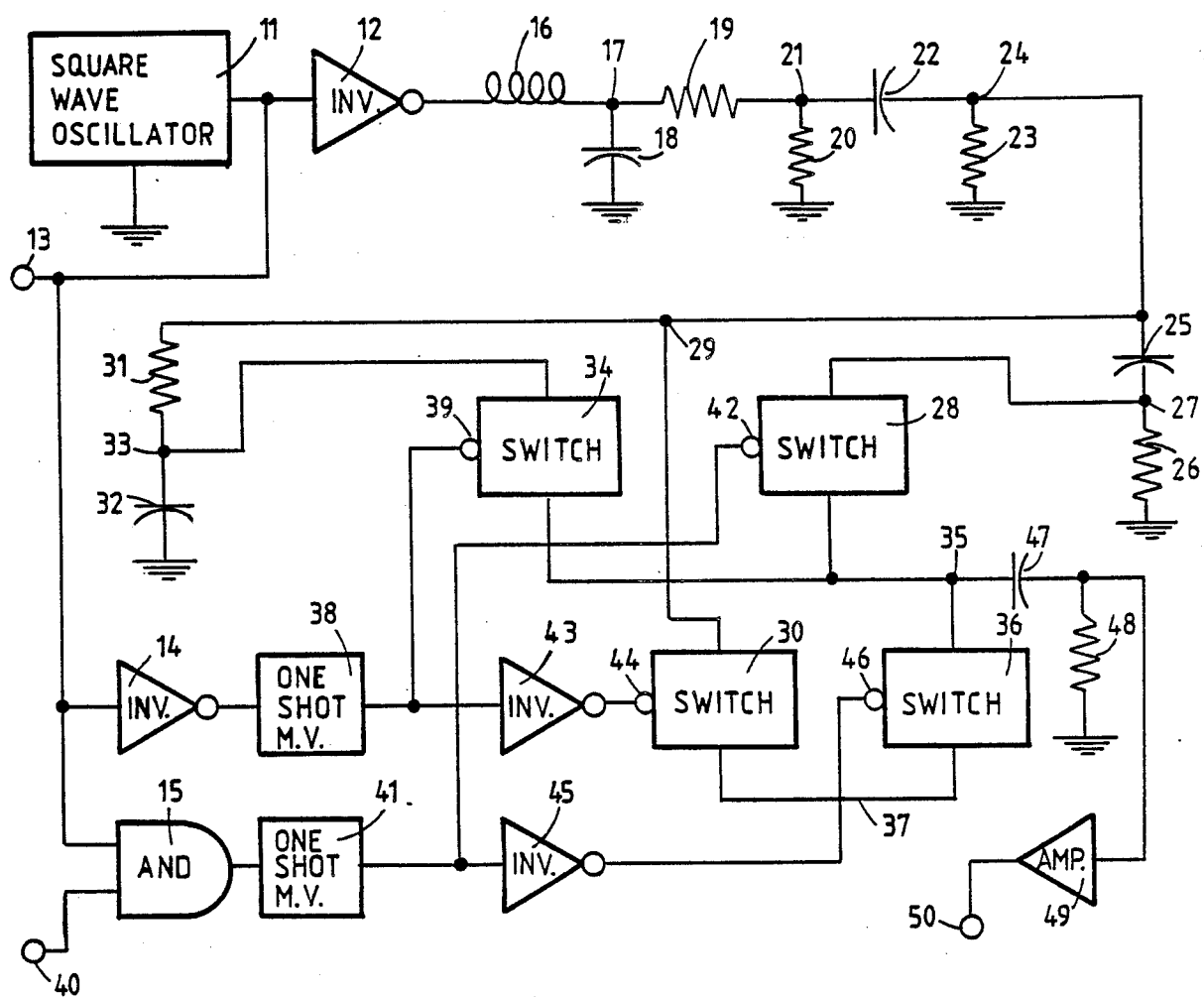
FIG. 1. is the schematic diagram of the improved circuit for pulsed digital modulation of a sine wave carrier having the same frequency as the clock oscillator used for timing the digital modulation pulses.

Referring to FIG. 1, a square wave oscillator 11 generates the clock frequency square wave and is connected to the input of inverter 12, clock output terminal 13, the input of inverter 14, and a first input terminal of AND gate 15. The output of inverter 12 is connected to the input of inductor 16, the output of which is connected to point 17. Capacitor 18 is connected between point 17 and ground. Inductor 16 and capacitor 18 form a low pass filter, so that a sine wave is present at terminal 17. Resistors 19 and 20 form a voltage divider to reduce the voltage at point 17 to about one volt RMS at terminal 21, so that the quad bilateral switches can safely handle the carrier. Capacitor 22 and resistor 23 comprise a phase shift circuit which introduces a leading phase angle to compensate for the lagging phase angle from the low pass filter at point 17. Point 24 is the sine wave carrier zero phase angle output which is accurately in phase with the square wave of clock oscillator 11. The carrier at point 24 is connected to capacitor 25 and series resistor 26 which is grounded. Point 27 delivers a leading phase angle carrier to the input of bilateral switch 28. The zero phase angle carrier at point 29 is connected to the input of bilateral switch 30. Point 29 is connected to a lagging phase shift circuit composed of resistor 31 and capacitor 32 which is grounded. Point 33 delivers a lagging phase angle carrier to the input of bilateral switch 34. The output terminals of bilateral switches 28 and 34 are connected to point 35 which is the phase modulated carrier output. The output of bilateral switch 30 is connected to the input of bilateral switch 36 by wire 37. The output of bilateral switch 36 is connected to point 35. The input of inverter 14 receives the square wave of the clock frequency. During the positive excursion of the clock frequency the input of inverter 14 is high and its output low. When the clock frequency goes negative at its half cycle point, the output of inverter 14 goes positive. The output of inverter 14 is connected to the trigger of one shot multivibrator 38 which gives a short output pulse when it receives a positive pulse from the inverter 14. The output pulse from one shot multivibrator 38 drives the control terminal 39 of switch 34 to close switch 34 and conduct the lagging phase angle carrier from point 33 to point 35 during the duration of the pulse. Terminal 40 is the input connection for binary NRZ data clocked by the clock output at terminal 13, and is connected to the second input terminal of AND gate 15. The output of AND gate 15 is connected to the trigger of one shot multivibrator 41. When a digital one appears at point 40 at the start of a clock frequency cycle both inputs of AND gate 15 are high and the AND gate output pulse triggers one shot multivibrator 41, which delivers a short pulse to the control terminal 42 of bilateral switch 28, thus closing switch 28 for the duration of the pulse and conducting the leading phase angle carrier from point 27 to point 35. The input of inverter 43 is connected to receive the output pulse from multivibrator 38, and the output of inverter 43 is connected to control terminal 44 of bilateral switch 30. When no pulses are being generated by normally quiescent multivibrators 38 and 41, the inputs of inverters 43 and 45 are low, making their outputs high, thus driving bilateral switches 30 and 36 closed and thus conducting the undeviated carrier from point 29 to point 35. When a pulse appears at the input of inverter 43, its negative complement appears at control terminal 44 of switch 30 and opens switch 30 thus cutting off the undeviated carrier from point 35. Simultaneously, the pulse at the input of inverter 43 drives control terminal 39 of switch 34 to close switch 34 which conducts a lagging phase angle carrier to point 35. In similar fashion, when a pulse appears at the input of inverter 45, its negative complement appears at the control terminal 46 and opens switch 36 thus cutting off the undeviated carrier from point 35 during the duration of the pulse. Simultaneously, the pulse at the input of inverter 45 drives control terminal 42 of switch 28 to close switch 28 which conducts a leading phase angle carrier from point 27 to point 35. In this manner, point 35 receives both the undeviated and the pulsed deviated carrier from switches 28, 34, 30 and 36, with coded phase deviations controlled by the simple logic circuits shown. Capacitor 47 couples point 35 to load resistance 48 and to the input of isolation amplifier 49, the output of which is delivered to output terminal 50.

Figure 2:
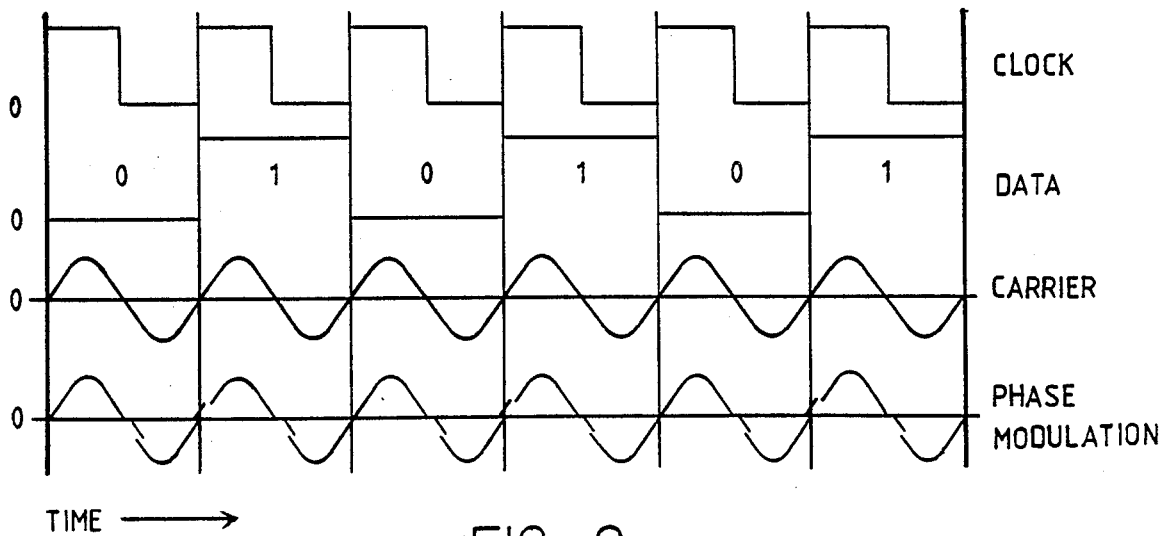
FIG. 2. is a timing diagram showing wave forms of a sample transmission using pulsed biphase digital modulation. Clock frequency, digital data, carrier frequency, and the phase modulated carrier are shown in their timing relationship.

Referring to FIG. 2, the waveforms at various points in the diagram of FIG. 1 are shown graphically. In the first line, the square wave clock frequency at terminal 13 is shown. In the second line, NRZ digital data at input terminal 40 is shown. In the third line, the synchronized sine wave carrier at point 29 is shown, while in the fourth line, the phase deviations of the pulsed biphase modulated carrier at point 35 are shown.

The circuit of FIG. 1 was operated at a clock frequency of 15KHz, using 10 degree phase deviations and 5 microsecond wide pulses to control terminals 39 and 42 of bilateral switches 34 and 28 respectively. The oscilloscope display of the modulated carrier at point 35 looked exactly like the fourth line in FIG. 2. No transients were observable. The circuit of FIG. 1 will probably operate correctly up to the upper frequency limit of the CMOS integrated circuit components used.

While the preferred embodiment of the invention has been described, the form of the invention should be considered as illustrated and not limiting the scope of the claims.

I claim:

1. An improved pulsed modulator circuit for deviating the phase of a carrier frequency twice per cycle comprising:
    an oscillator having a square wave clock frequency output;
    a low pass filter for converting said square wave clock frequency to a sine wave carrier;
    a first phase shifting circuit for synchronizing the phase of said sine wave carrier with said square wave clock frequency;
    a second phase shifting circuit receiving said sine wave carrier and having a leading phase angle output;
    a third phase shifting circuit receiving said sine wave carrier and having a lagging phase angle output;
    a first bilateral semiconductor switch having an input and an output and a control terminal with said input connected to the output of said second phase shifting circuit and with said output connected to an output circuit;
    a second bilateral semiconductor switch having an input and an output and a control terminal with said input connected to the output of said third phase shifting circuit and with said output connected to said output circuit;
    third and fourth bilateral semiconductor switches having inputs and outputs and control terminals and with the output of said third switch connected to the input of said fourth switch;
    said third switch connected to the output of said first phase shifting circuit at its input and said fourth switch output connected to said output circuit;
    a digital processing circuit receiving externally generated binary digital data at its input with said data clocked by said clock frequency;
    said digital processing circuit delivering coded short positive pulses to said control terminals of said first and second switches and their complementary negative pulses to the control terminals of said third and fourth switches and
    said digital processing circuit controlling the outputs of said four switches to connect said carrier or brief pulsed phase deviations of said carrier to said output circuit at the start and at the middle of a cycle of said carrier frequency.

2. An improved pulsed biphase modulator circuit for deviating the phase of a carrier frequency twice per cycle comprising:
    a source of a square wave clock frequency;
    circuit means for generating a sine wave carrier frequency equal to said clock frequency;
    circuit means for synchronizing the phase of said sine wave carrier frequency with the phase of said clock frequency;

static circuit means having phase shifted outputs of leading and lagging phase angles of said carrier frequency;

semiconductor switching means for selecting either of said phase shifted outputs or said carrier frequency at an output circuit;

digital processing circuit means receiving said clock frequency and externally generated binary digital data and controlling said semiconductor switching means whereby said carrier frequency is modulated by brief phase deviations at the start and at the middle of a cycle of said carrier frequency at said output circuit.

3. The method of deviating the phase of a sine wave carrier frequency twice per cycle which comprises:

generating a square wave clock frequency;

generating a sine wave carrier frequency which is in phase synchronism with said square wave clock frequency;

applying said carrier frequency to a phase shift circuit having a leading phase angle output connected to the input of a first semiconductor bilateral switch;

applying said carrier frequency to a phase shift circuit having a lagging phase angle output connected to the input of a second semiconductor bilateral switch;

applying said carrier frequency to the input of a third semiconductor bilateral switch having an output connected to the input of a fourth semiconductor bilateral switch;

connecting the outputs of said first, second, and fourth semiconductor bilateral switches to an output circuit;

receiving clocked binary digital data at an input terminal of a digital processing circuit which also receives said square wave clock frequency;

processing said data in said digital processing circuit to produce pulses controlling said semiconductor bilateral switches and actuating said switches by said pulses of said digital processing circuit whereby brief phase deviations of said carrier take place at the zero crossing points of said carrier in said output circuit.

4. An improved pulsed biphase modulating circuit for deviating the phase of a carrier twice per cycle comprising:

a source of a square wave clock frequency;

a source of a sine wave carrier frequency equal to said clock frequency;

means for synchronizing the phase of said clock frequency and said carrier frequency;

a circuit shifting the phase of said carrier frequency and having a leading phase angle output;

a circuit shifting the phase of said carrier frequency and having a lagging phase angle output;

a digital processing circuit receiving binary digital data clocked by said clock frequency;

a first pulse generator triggered by said digital processing circuit and having an output pulse timed at the beginning of a cycle of said clock frequency;

a second pulse generator triggered by said digital processing circuit and having an output pulse timed at the middle of a cycle of said clock frequency and semiconductor bilateral switches controlled by said pulses to disconnect said carrier frequency and connect the outputs of said phase shifting circuits to the output of said modulating circuit at the start and at the middle of a cycle of said carrier frequency whereby said carrier is briefly phase modulated at its zero crossing points.

* * * * *